US008331555B1

(12) United States Patent
Mundschau et al.

(10) Patent No.: US 8,331,555 B1
(45) Date of Patent: Dec. 11, 2012

(54) HARDWARE-IMPLEMENTED MD5 FUNCTION

(75) Inventors: Steven T. Mundschau, Waukesha, WI (US); Robert C. Botchek, Brookfield, WI (US)

(73) Assignee: Guidance-Tableau, LLC, Pasadena, CA (US)

(*) Notice: Subject to any disclaimer, the term of this patent is extended or adjusted under 35 U.S.C. 154(b) by 927 days.

(21) Appl. No.: 12/277,039

(22) Filed: Nov. 24, 2008

(51) Int. Cl.
*H04L 9/00* (2006.01)

(52) U.S. Cl. .................................................. 380/28

(58) Field of Classification Search .............. 380/28; 713/187
See application file for complete search history.

(56) References Cited

U.S. PATENT DOCUMENTS

| 7,286,664 | B1 | 10/2007 | Stolov |
| 7,299,355 | B2 | 11/2007 | Qi |
| 7,376,826 | B2 | 5/2008 | Tardo et al. |
| 7,400,722 | B2 | 7/2008 | Qi et al. |
| 7,401,110 | B1 | 7/2008 | Rarick |
| 7,684,563 | B1* | 3/2010 | Olson et al. ................. 380/28 |
| 2002/0032551 | A1* | 3/2002 | Zakiya .......................... 703/2 |
| 2002/0199110 | A1 | 12/2002 | Kean |
| 2006/0010327 | A1 | 1/2006 | Koshy et al. |
| 2008/0082741 | A1 | 4/2008 | Biessener et al. |

OTHER PUBLICATIONS

"MD5 Hash Algorithm Hardware Realization on a Reconfigurable FPGA Platform" (Jan. 24, 2008) by I.N. Tselepis1, M.P. Bekakos1, A.S. Nikitakis1, and E.A. Lipitaki; 4 pages; originally downloaded from http://www.aueb.gr/pympe/hercma/proceedings2007/H07-FULL-PAPERS-1/TSELEPIS-BEKAKOS-NIKITAKIS-LIPITAKIS-1.pdf.*

"md5.py—calculate the md5 hash of stdin" (Jul. 25, 2004) by Philippe Biondi; 2 pages; converted to PDF originally from http://www.secdev.org/python/md5.py.*
Lee et al., "Design Methodology for Throughput Optimum Architectures of Hash Algorithms of the MD4-class," Journal of Signal Processing Systems; vol. 53, Issue 1-2 (published online May 31, 2008) ISSN: 1939-8018 (print) 1939-8115 (online) (26 pages).
Järvinen et al., "Hardware Implementation Analysis of the MD5 Hash Algorithm," Proceedings of the 38th Hawaii International Conference on System Sciences (Jan. 3-6, 2005) (10 pages).
Deepakumara et al., "FPGA Implementation of MD5 Hash Algorithm," Canadian Conference on Electrical and Computer Engineering; Toronto, Canada; May 13-16, 2001; ISBN: 0-7803-6715-4 (6 pages).

(Continued)

*Primary Examiner* — Carl Colin
*Assistant Examiner* — Phillip Auger
(74) *Attorney, Agent, or Firm* — Christie, Parker & Hale, LLP

(57) ABSTRACT

An MD5 processing apparatus is a hardware-implemented MD5 process in a programmable device such as an FPGA or the like. The programmable device is programmed to include four processing engines, each of which performs a single MD5 stage having four MD5 operations performed by the MD5 stage. Each stage begins with four 32-bit values in an A register, a B register; a C register; and a D register. These values are processed using four sub-stages in the MD5 stage using a number of adders along with fixed nonlinear function processing units and fixed 32-bit-shift units. The fixed nonlinear function processing units in a given stage implement only the nonlinear function needed for the MD5 round being performed by the stage. Likewise, each fixed 32-bit-shift unit uses direct bit routing to effect bit shifts taking advantage of the cyclic nature of shifts required by the MD5 hashing algorithm.

10 Claims, 11 Drawing Sheets

OTHER PUBLICATIONS

RFC 1321, "The MD5 Message-Digest Algorithm," Networking Group, MIT Laboraotry for Computer Science and RSA Data Security, Inc.; Apr. 1992 (21 pages).

Spartan-3E FPGA Family: Complete Data Sheet; Xilinix, Inc.; DS312 May 19, 2006 (230 pages).

* cited by examiner

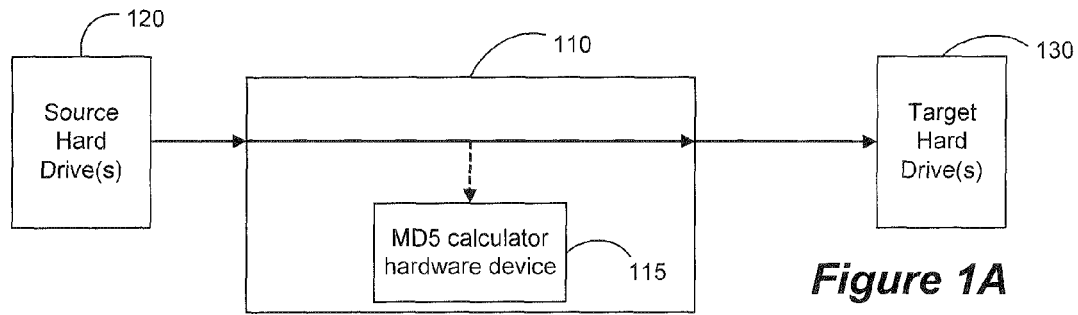
Figure 1A
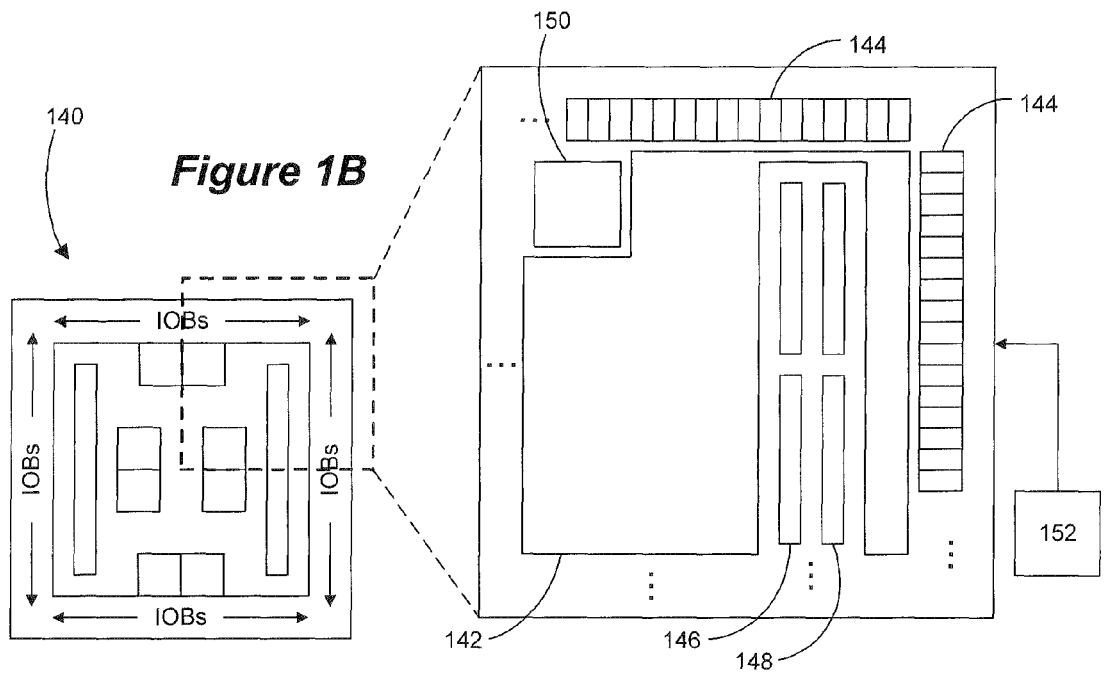
Figure 1B
Figure 5
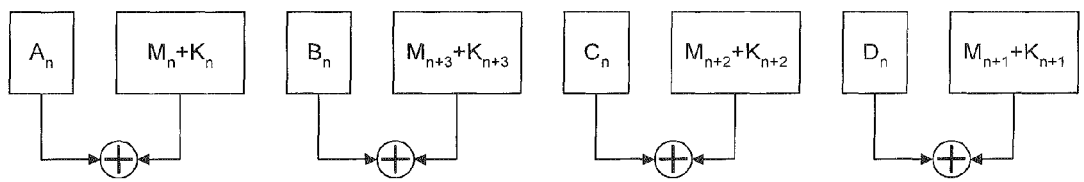

| Operation | M | K | S |
|---|---|---|---|
| 01 | 0 | 0xd76aa478 | 7 |
| 02 | 1 | 0xe8c7b756 | 12 |
| 03 | 2 | 0x242070db | 17 |
| 04 | 3 | 0xc1bdceee | 22 |
| 05 | 4 | 0xf57c0faf | 7 |
| 06 | 5 | 0x4787c62a | 12 |
| 07 | 6 | 0xa8304613 | 17 |
| 08 | 7 | 0xfd469501 | 22 |
| 09 | 8 | 0x698098d8 | 7 |
| 10 | 9 | 0x8b44f7af | 12 |
| 11 | 10 | 0xffff5bb1 | 17 |
| 12 | 11 | 0x895cd7be | 22 |
| 13 | 12 | 0x6b901122 | 7 |
| 14 | 13 | 0xfd987193 | 12 |
| 15 | 14 | 0xa679438e | 17 |
| 16 | 15 | 0x49b40821 | 22 |
| 17 | 1 | 0xf61e2562 | 5 |
| 18 | 6 | 0xc040b340 | 9 |
| 19 | 11 | 0x265e5a51 | 14 |
| 20 | 0 | 0xe9b6c7aa | 20 |
| 21 | 5 | 0xd62f105d | 5 |
| 22 | 10 | 0x02441453 | 9 |
| 23 | 15 | 0xd8a1e681 | 14 |
| 24 | 4 | 0xe7d3fbc8 | 20 |
| 25 | 9 | 0x21e1cde6 | 5 |
| 26 | 14 | 0xc33707d6 | 9 |
| 27 | 3 | 0xf4d50d87 | 14 |
| 28 | 8 | 0x455a14ed | 20 |
| 29 | 13 | 0xa9e3e905 | 5 |
| 30 | 2 | 0xfcefa3f8 | 9 |
| 31 | 7 | 0x676f02d9 | 14 |
| 32 | 12 | 0x8d2a4c8a | 20 |
| 33 | 5 | 0xfffa3942 | 4 |
| 34 | 8 | 0x8771f681 | 11 |
| 35 | 11 | 0x6d9d6122 | 16 |
| 36 | 14 | 0xfde5380c | 23 |
| 37 | 1 | 0xa4beea44 | 4 |
| 38 | 4 | 0x4bdecfa9 | 11 |
| 39 | 7 | 0xf6bb4b60 | 16 |
| 40 | 10 | 0xbebfbc70 | 23 |
| 41 | 13 | 0x289b7ec6 | 4 |

| Operation | M | K | S |
|---|---|---|---|
| 42 | 0 | 0xeaa127fa | 11 |
| 43 | 3 | 0xd4ef3085 | 16 |
| 44 | 6 | 0x04881d05 | 23 |
| 45 | 9 | 0xd9d4d039 | 4 |
| 46 | 12 | 0xe6db99e5 | 11 |
| 47 | 15 | 0x1fa27cf8 | 16 |
| 48 | 2 | 0xc4ac5665 | 23 |
| 49 | 0 | 0xf4292244 | 6 |
| 50 | 7 | 0x432aff97 | 10 |
| 51 | 14 | 0xab9423a7 | 15 |
| 52 | 5 | 0xfc93a039 | 21 |
| 53 | 12 | 0x655b59c3 | 6 |
| 54 | 3 | 0x8f0ccc92 | 10 |
| 55 | 10 | 0xffeff47d | 15 |
| 56 | 1 | 0x85845dd1 | 21 |
| 57 | 8 | 0x6fa87e4f | 6 |
| 58 | 15 | 0xfe2ce6e0 | 10 |
| 59 | 6 | 0xa3014314 | 15 |
| 60 | 13 | 0x4e0811a1 | 21 |
| 61 | 4 | 0xf7537e82 | 6 |
| 62 | 11 | 0xbd3af235 | 10 |
| 63 | 2 | 0x2ad7d2bb | 15 |
| 64 | 9 | 0xeb86d391 | 21 |

*Figure 3B*

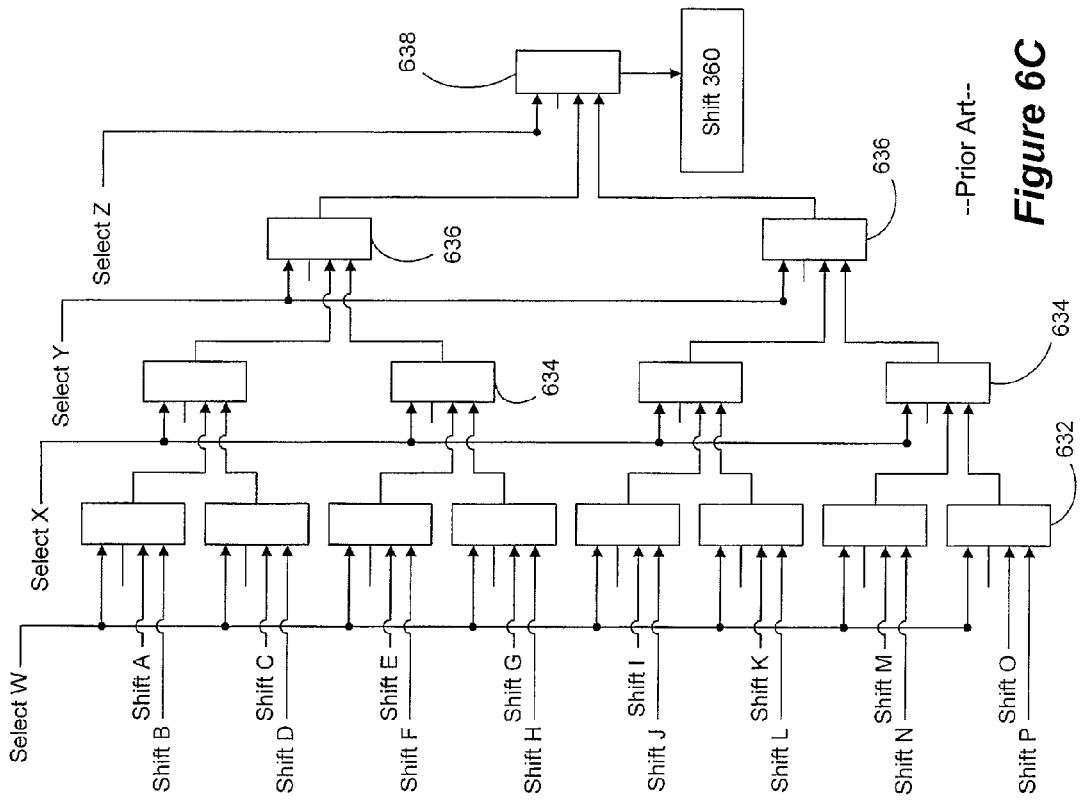
*Figure 6C* --Prior Art--
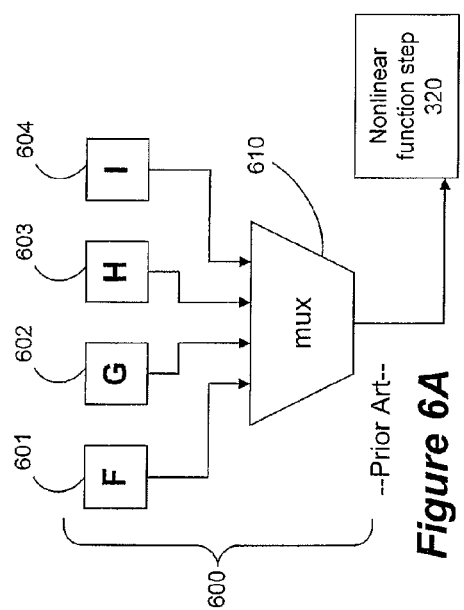
*Figure 6A* --Prior Art--
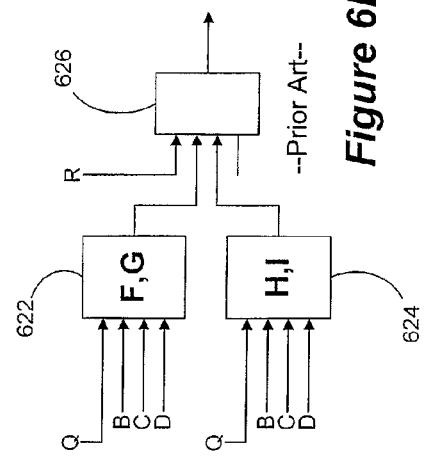
*Figure 6B* --Prior Art--

HARDWARE-IMPLEMENTED MD5 FUNCTION

CROSS-REFERENCE TO RELATED APPLICATIONS

None.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

The present invention relates generally to the field of data hashing, and more specifically to a hardware implementation of the MD5 hash function. In particular, the invention is directed to a hardware implementation to reduce the hardware resource utilization and power consumption requirements and also increase the speed at which MD5 procedures may be performed on data, for example in a hard disk duplicator.

2. Description of Related Art

Data encryption is commonly utilized in a variety of settings. There are four basic categories of cryptographic algorithm functionality: public key encryption algorithms, bulk encryption algorithms, random number generation algorithms and hashing algorithms. In order to ensure data integrity, several standard cryptographic hash algorithms have been developed and include MD5 (i.e., Message Digest 5). The MD5 algorithm is described in RFC1321, which is incorporated by reference herein for all purposes.

Briefly, MD5 is a one-way hash function used in many situations, such as creating digital signatures in forensic data management. The MD5 process converts a message into a fixed-length string of digits (that is, a message digest). The one-way hash function allows a calculated message digest to be compared against a later-calculated message digest for the same data to determine whether or not the message has been tampered with, corrupted, inadvertently changed, etc.

The MD5 algorithm pads a b-bit input message so that its length in bits is congruent to 448, modulo 512, after which a 64-bit representation of the message length is appended, resulting in a 512-bit hash message (that is, a hash message length that is an exact multiple of 16 words that are each 32 bits long). A four word buffer (four registers typically designated A, B, C, D) is used to compute the message digest, where each of A, B, C and D is a 32-bit register that is initialized to established hexadecimal values. The MD5 process then performs 4 rounds of 16 operations each.

A hard-drive replicator or duplicator produces an exact copy (that is, a replica) of a hard-drive. Conventional hard-drive duplicators are mainly self-contained, stand-alone devices having a number of drive interfaces. For example, a typical hard-drive duplicator may include a single drive interface for purposes of connecting a source drive and one or more interfaces for purposes of connecting target drives. When activated, the duplicator copies data from the source drive to each target drive. Further information can be found in United States Publication No. 2008/0082741, published Apr. 3, 2008, which is incorporated herein by reference for all purposes.

Systems, apparatus and/or other hardware implementations that provide improved MD5 hashing without diminishing the speed of a replicator, duplicator or other hard-drive copying device or system would represent a significant advancement in the art.

BRIEF DESCRIPTION OF THE DRAWINGS

The present invention will be readily understood by the following detailed description in conjunction with the accompanying drawings, wherein like reference numerals designate like structural elements, and in which:

FIG. 1A is block diagram of a hard disk duplication system.

FIG. 1B is a block diagram of a programmable device usable in connection with embodiments of the present invention.

FIG. 3B is a table of MD5 values.

FIG. 5 shows block representations of pre-adding of MD5 values.

FIG. 6A is a block diagram of a multiplexer used in earlier MD5 hashing processes for selecting a nonlinear function to implement in MD5 hashing.

FIG. 6B is a schematic diagram of the nonlinear function selection implementation of FIG. 6A in a programmable device using 4-input LUTs.

FIG. 6C is a schematic diagram of a shift value selection implementation in a programmable device using 4-input LUTs.

DETAILED DESCRIPTION

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

Certain terms are used throughout the description and claims to refer to particular system components. As one skilled in the art will appreciate, computer and other companies may refer to components by different names. This disclosure does not intend to distinguish between components that differ insubstantially. Phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate. The term "system" refers broadly to a collection of two or more components and may be used to refer to an overall system (e.g., a computer system or a network of computers), a subsystem provided as part of a larger system (e.g., a subsystem within an individual computer), and/or a process or method pertaining to operation of such a system or subsystem. In this specification and the appended claims, the singular forms "a," "an," and "the" include plurals unless the context clearly dictates otherwise. Unless defined otherwise, technical and scientific terms used herein have the same meanings that are not inconsistent to one of ordinary skill in the art relevant subject matter disclosed and discussed herein. The terms "duplication" and "replication" and related terms (for example, "duplicator" and "replicator") are used interchangeably.

Reference in the specification to "some embodiments," "one embodiment," "an embodiment," etc. of the present invention means that a particular feature, structure or characteristic described in connection with such embodiment(s) is included in at least one embodiment of the present invention. Thus, the appearances of the noted phrases appearing in various places throughout the specification are not necessarily all referring to the same embodiment.

Figure 2:
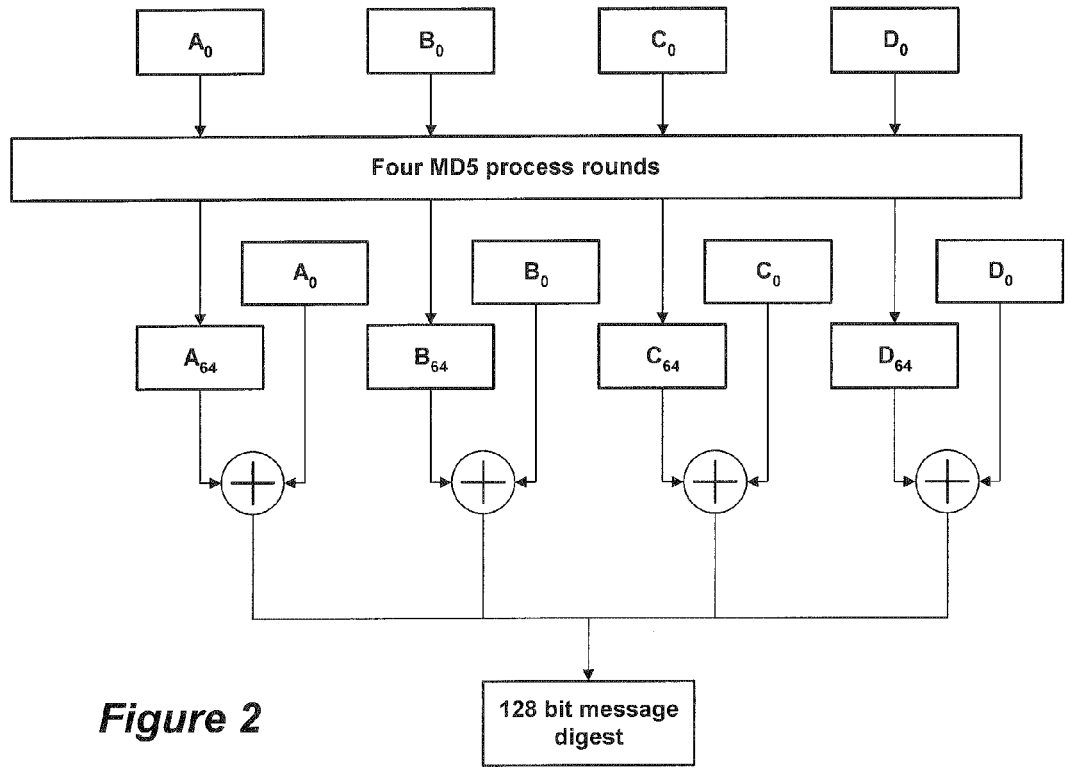
FIG. 2 is a flow diagram of an MD5 hashing operation.
Figure 3A:
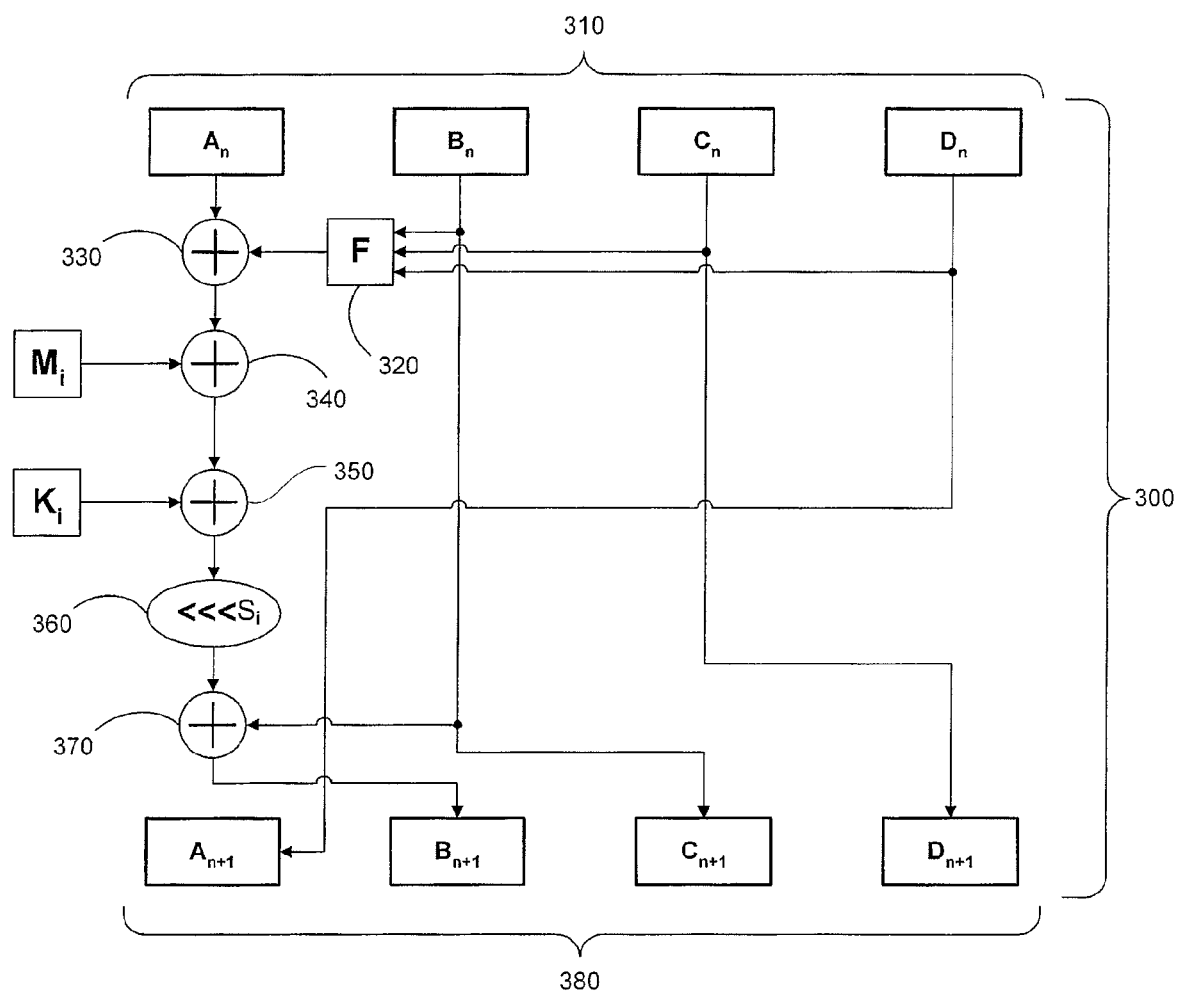
FIG. 3A is a flow diagram of an MD5 hashing operation.

Hard drive replication system are typically constructed using a combination of off-the-shelf and custom or semi-custom electronic devices such as field programmable gate arrays (FPGAs). In earlier replication implementations, the electronic devices in such systems are capable of moving data from the source drive to the target drive(s) much more quickly than they are capable of calculating a hash such as an MD5 hash. Consequently, the calculation of the MD5 or similar message digest significantly slows the performance of modern hard drive replicators, greatly lengthening duplication times. Speed of execution is nearly always a paramount consideration in hard-drive duplication, so hashing during duplication needs to be performed as quickly as possible, and with as little impact on duplication speed as possible. By way of example, a typical complete MD5 hash consisting of 4 rounds and a final addition step may require 65 clock cycles (for example, as shown in FIGS. 2, 3A, and 3B). Because earlier hashing functions in hard-drive duplicators and the like have had a substantial negative impact on duplicator performance, in particular with regard to speed as noted above, many duplicators either do not offer hashing or the like, or they provide only substantially speed-inhibited systems. The MD5 process is one of the hashing functions made available due to its relative security and reliability, as well as its widespread deployment in computer forensic and security-related fields.

As noted above, the MD5 digesting process comprises four computational rounds, in which each round includes 16 operations. Although the MD5 digesting process can be implemented through software simulations, a hardware implementation of the digesting process often is more desirable because of the higher processing speed of hardware solutions. It is advantageous when a digesting process does not significantly slow down data processing speed for other functions, such as duplication. All embodiments of the present invention are hardware implementations, improving MD5 computation speed substantially so that the overall replicator data processing speed will not be slowed down or so that any impact on speed is insubstantial. Some embodiments of the present invention also allow MD5 "stage" modules (as defined herein) to be efficiently implemented on a chip (for example, a programmable device such as an FPGA), and thus reduce power consumption, costs and complexity. Some earlier hardware implementations of MD5 hashing provided a full hardware "cycle" for each MD5 round; that is they implement hardware for all 16 operations in a round without any repetition in the use of the hardware components. Embodiments of the present invention require only one fourth the hardware resources of one of these prior "non-repeating" round designs.

Embodiments of the present invention comprise hardware implementations of the MD5 digesting process. The MD5 digesting process produces a 128 bit digest for a message/data string of an arbitrary size. The digesting process is described using a variety of terminologies in the art. Therefore, for purposes of this specification, the MD5 digesting process is described as consisting of 64 "operations" performed in 4 "rounds" of 16 operations each. Embodiments of the present invention provide hardware implementations of the MD5 algorithm that reduce the hardware usage and time needed to perform the MD5 algorithm in a given setting. Other embodiments of the present invention are directed to such hardware implementations used in connection with hard-drive replicators that use (in some cases, at the user's option) the MD5 hashing function in connection with replication and/or forensic data applications.

In some embodiments of a hardware-implemented MD5 function, the hardware includes a programmable device such as an FPGA or the like. Other devices and apparatus can serve as part of and/or the basis for the MD5 hardware implementation, but an FPGA will be used in one or more examples. As is well known to those skilled in the art, an FPGA is essentially "blank" prior to programming by a configuration bitstream or the like. A configured (or programmed) FPGA may have various processing elements, lookup tables, etc. that can be utilized in performing its tasks.

FIG. 1A depicts a general hard-drive duplicator 110 that is coupled to a source hard-drive 120 and one or more target hard-drives 130. The duplicator 110 may comprise a number of devices such as routers, memory buffers, switches, and bridges to facilitate data passage from one hard-drive to another. Data communicated among different devices may include video, audio, messages, and other data. The duplicator system may use an MD5 calculator 115 for a digesting process used in message verification and authentication to improve the security of network communications. The MD5 calculator 115 can be implemented as a hardware implementation such as a programmed FPGA (or a programmable FPGA with configuration data, such as a programming bitstream or the like included).

FIG. 1B illustrates a programmable device that can be used in one embodiment, an FPGA 140 that has configurable logic blocks (CLBs) 142, input/output blocks (IOBs) 144, block RAM 146, multiplier blocks 148, and a digital clock manager (DCM) 150. Configuring the programmable device 140 can be specified at least in part by configuration data stored in configuration memory 152. The configuration data can include parameters as well as the configuration of the programmable device's implemented circuitry. Additional configuration data can be stored in other parts of the programmable device. For example, the configuration data can include look-up table data to be stored in look-up table hardware in a logic cell. As will be appreciated by those skilled in the art, typical programmable devices will include thousands or tens of thousands of elements to permit various configurations. A variety of hardware devices can be used in connection with embodiments of the present invention, for example hardware devices that are specifically configured (via programming or the device's physical structure), such as application-specific integrated circuits (ASICs), other programmable logic devices (PLDs), CPLDs, etc.

The MD5 process can be depicted simply as shown in FIG. 2, wherein initial register values for A, B, C and D are manipulated through 64 operations to achieve a 128-bit digest value. Another common depiction is shown in FIG. 3A, which shows the steps involved in each of the 64 operations of the MD5 process. The portrayal of the MD5 algorithm in FIG. 3A shows a single operation 300, in which initial register 310 values $A_n$, $B_n$, $C_n$ and $D_n$ are processed to move to the next iterative values 380 of $A_{n+1}$, $B_{n+1}$, $C_{n+1}$ and $D_{n+1}$. During performance of the nonlinear function step 320, the modulo addition of step 340 and the modulo addition of step 350, and the shift step 360 the hardware or software implementations of earlier systems "looks up" the appropriate function and/or value of F (or G, H or I), message segment $M_j$, constant value $K_j$, and the shift amount $S_j$. A chart illustrating the values of M, K and S for each of the 64 operations is shown in FIG. 3B.

In earlier systems implementing the MD5 algorithm in hardware, the system consulted a lookup table or calculated a given value for each nonlinear function, message segment needed for a given operation, operation constant and/or bit-shift amount for that operation. Such implementations required performing the lookup function or other use of logic and/or resources to retrieve, calculate, etc. the needed value.

Figure 4:
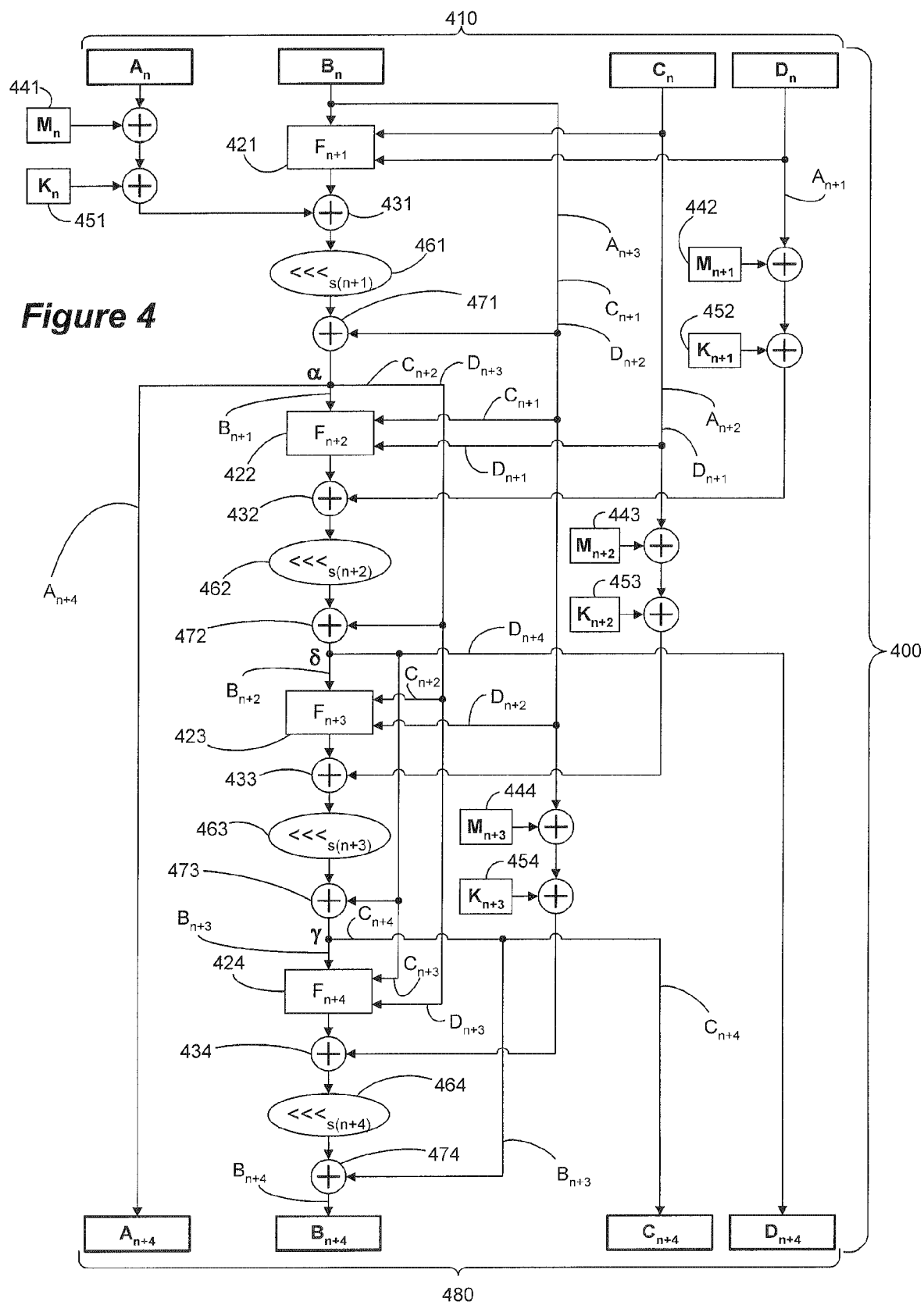
FIG. 4 is a flow diagram of a processing engine hardware implementation of an MD5 stage according one or more embodiments of the present invention.

FIG. 4 illustrates the workings of a processing engine according to one embodiment of the present invention using an MD5 "stage" 400 which processes initial register values 410 of $A_n$, $B_n$, $C_n$ and $D_n$ to arrive at final register values 480 of $A_{n+4}$, $B_{n+4}$, $C_{n+4}$ and $D_{n+4}$. FIG. 4 is a flow diagram showing a four-operation segment of the first round of the MD5 process performed by a hardware implementation according to one or more embodiments of the present invention. The process of FIG. 4 is repeated four times to perform a complete round of the MD5 process, for example operations 1-16 constituting the first round. During the process of FIG. 4, the interim values of $A_{n+1}$, $B_{n+1}$, $C_{n+1}$, $D_{n+1}$, $A_{n+2}$, $B_{n+2}$, $C_{n+2}$, $D_{n+2}$, $A_{n+3}$, $B_{n+3}$, $C_{n+3}$ and $D_{n+3}$ are determined and used as shown in FIG. 4. The M and K values can be pre-added, as shown in FIGS. 5 and 7B, to achieve potentially faster performance, too.

Figure 7E:
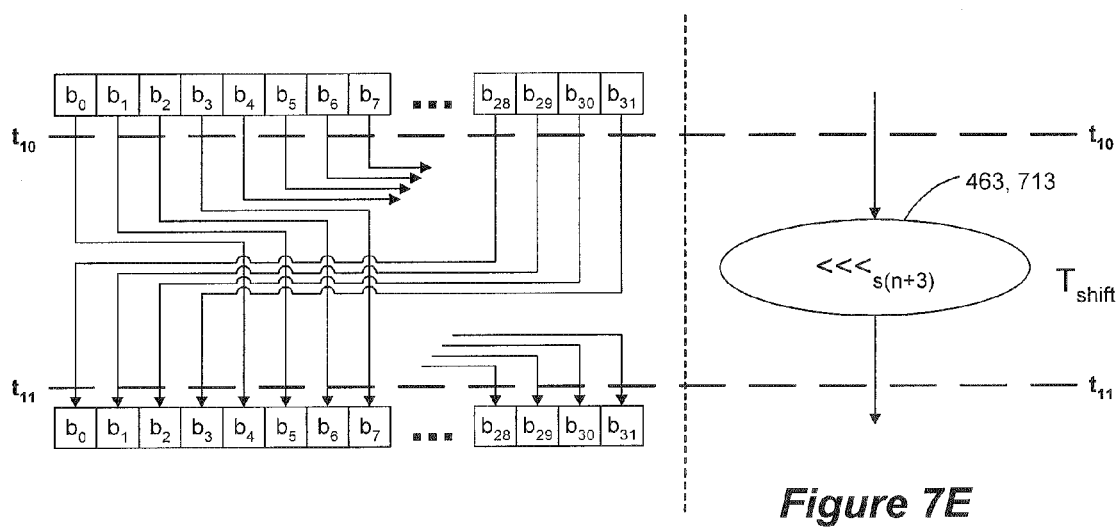
FIG. 7E is a partial timing diagram of a single fixed 32-bit-shift unit for an MD5 process.
Figure 7A:
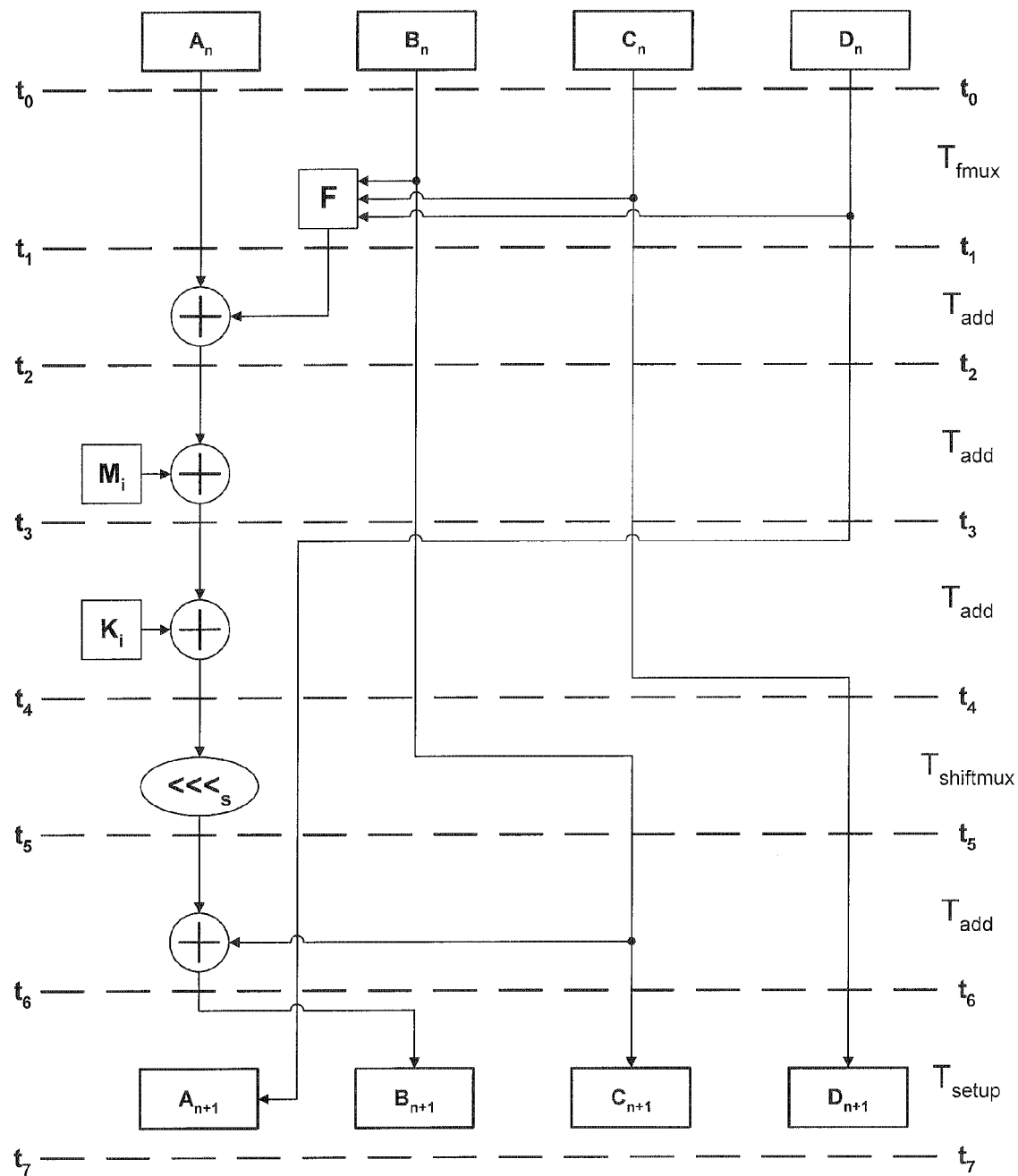
FIG. 7A is a timing diagram of a single-operation-iteration MD5 process.
Figure 7B:
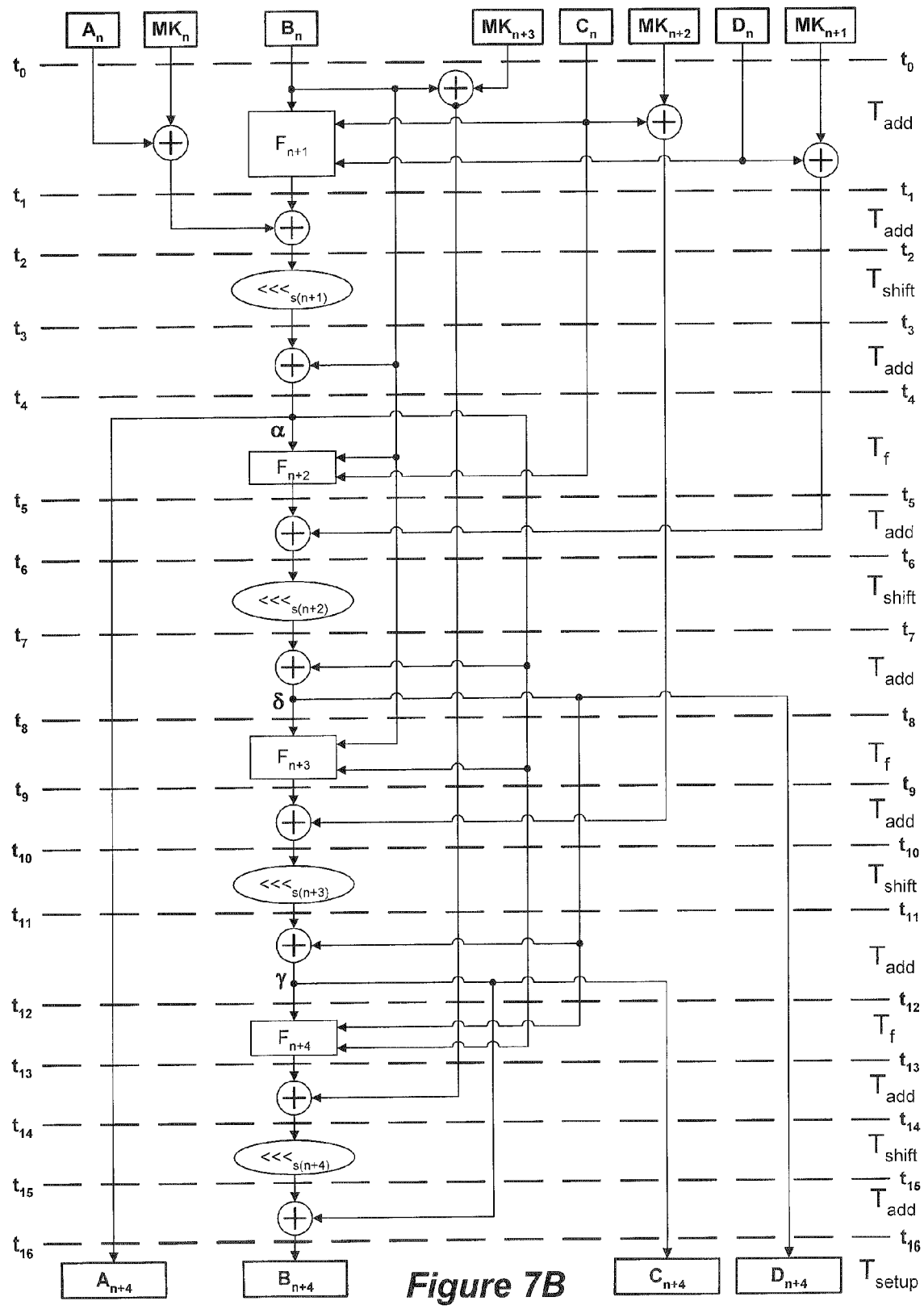
FIG. 7B is a timing diagram of a single-stage-iteration MD5 process for one or more of the first three rounds of an MD5 process.

The second, third and fourth stages of MD5 hardware implementations according to one or more embodiments of the present invention are implemented and perform analogously to the structure of FIG. 4 or 7B, but with appropriate changes to reflect which stage is being performed. For example, the nonlinear function for each stage is different. In earlier systems, a multiplexer configuration 610 such as the one shown in FIG. 6A must be used to choose the nonlinear function 601, 602, 603, 604 to be implemented. A similar multiplexing operation must be performed in these earlier systems for selecting the proper shift values during MD5 hashing. As is well known to those skilled in the art, multiplexing in FPGAs and the like is accomplished using look-up-tables (LUTs), which have a limited number of inputs and one output per LUT. Each small LUT is preprogrammed with the outputs required for all possible combinations of its inputs and large logic blocks are implemented by combining values from multiple LUTs. LUTs can be used in parallel to obtain multiple bit valued outputs. The outputs of LUTs can also be used as inputs to other LUTs to perform more complicated logical operations. In a standard 4-input LUT (common in many FPGAs and much less expensive than 6-input-LUT-based FPGAs), the LUT can be configured to perform a four-input-one-output logic operation. Since this is the smallest granularity of logic in the programmable device, a LUT must be used for any two-input or three-input logic operation as well. This results in two-input, three-input and four-input operations all incurring the same time duration for each calculation, regardless of the number of inputs. Likewise, a five-input operation will require at least two LUTs chained together with the output from one LUT feeding an input of the second LUT. Since both of these LUTs will consume the same amount of time for their individual parts of the calculation, a five-input logic operation will require twice the amount of time as a four-input logic operation.

An example of a nonlinear function multiplexer implemented by standard 4-input FPGA LUTs is shown in FIG. 6B and is a sample of how the standard one-operation MD5 hashing is performed in earlier hardware implementations in a programmable device such as an FPGA. The three register values B, C, D and a selection bit Q are inputs to a first LUT 622 that outputs either the bit value corresponding to the F nonlinear function or the G nonlinear function. Likewise, the three register bit values B, C, D and selection bit Q are inputs to a second LUT 624 that outputs either the bit value corresponding to the H nonlinear function or the I nonlinear function. The outputs of LUTs 622 and 624 are used along with a second selection bit R as inputs to a third LUT 626 that outputs the final nonlinear function bit value appropriate for a given operation in the MD5 hash. This multiplexing structure is implemented 32 times, once for each bit in the register values. As can be seen from FIG. 6B, because there are 3 input bit values and 2 selection bit values, the nonlinear function multiplexer requires 3 LUTs per instantiation. Embodiments of the present invention do not require the use of the selection bits Q, R for performing the nonlinear function step in each instantiation, thus saving half the time required in the example of FIG. 6B. This is due to the fact that only the three input bit values B, C, D are used because the nonlinear function does not change within each stage of the hardware implementation of the present invention.

Likewise, even greater time savings are realized in the shift function of the MD5 hashing process. Earlier systems implementing the standard MD5 process using a single operation for each iteration must select from 16 potential shift values (found in FIG. 3B). The 16-to-1 multiplexing function therefore follows FIG. 6C wherein each LUT 632 in the first time segment uses two input bit values (potential shift amounts) and one selection bit (W in the first time segment). In the second time segment, selection bit X is used to choose between two outputs from a first time segment LUT 632 in each of the second time segment LUTs 634. Selection bit Y is used in connection with third time segment LUTs 636 and finally selection bit Z is used in connection with the final time segment LUT 638 to eventually output the needed shifted bit value to shift 360 of FIG. 3A. Again, like the nonlinear function implementation discussed in connection with FIG. 6B, this 16-to-1 multiplexing function is repeated for each of the 32 bits during MD5 hashing. This requires implementation of 480 LUTs per shifted value and uses four time segments, all of which are avoided using the hardware implementation of the present invention because the shift values (for example, at steps 461, 462, 463 and 464 of FIG. 4) are static and do not have to be "selected" from all 16 possible values. A slight time delay is incurred using the hardware implementations of the present invention due to routing of the signal used in lieu of the multiplexed shift values, but this additional time is negligible when compared to the multiplexing required by implementations such as the one shown in FIG. 6C, commonly used in connection with MD5 hashing.

Embodiments of the present invention avoid this step and the associated use of hardware resources because implementations such as those shown in FIGS. 4 and 7B merely have the nonlinear function (that is, just one of the nonlinear functions 601, 602, 603 or 604) programmed for the given stage. Embodiments of the present invention thus avoid multiplexing step 610 or the like because each function 421, 422, 423, 424 of FIG. 4 is not a "selected" function (this leads to $T_f$ being faster (that is, of shorter duration) than $T_{fmux}$, as discussed in more detail below). The four nonlinear functions F, G, H, I of the MD5 process also are discussed in more detail below. For each of the four stages of the MD5 process, a different nonlinear function is thus used and appropriate M, K and S values are implemented. As seen in FIG. 3B, the S values are cyclic so that the S shift values in steps 461, 462, 463, 464 of FIG. 4 are static within each stage 400, obviating the need for looking up, calculating, multiplexing or otherwise performing any other step or using any other logic, again saving time and logic for the hardware implementations according to embodiments of the present invention.

As can be seen in FIG. 4, a time-critical (that is, minimum time) path for hardware implementation stage 400 extends from an initial register ($A_n$ or $B_n$) to a final register ($B_{n+4}$). This time-critical path helps to illustrate the time savings available using embodiments of the present invention, for example due to multiple uses of various intermediate values of A, B, C and D during a given stage.

FIG. 7A shows the timing of the standard MD5 process step of FIG. 3A, which is repeated 16 times in each round, for a total of 64 iterations due to the fact that this standard process does not use separate round blocks. In implementing this process in an FPGA or the like, the time increments shown (that is, t0, t1, etc.) are not necessarily equal to one another. For example, the time required for the nonlinear function step between t0 and t1 can be referred to as $T_{fmux}$ (the duration of first calculating the F, G, H and I functions in parallel, and then selecting the result appropriate for the current round). Likewise, the steps in which addition takes place may have a duration of $T_{add}$ (the duration required to add two 32-bit values together), the steps in which shifting is done may have a duration of $T_{shiftmux}$ (that is, the duration needed to select one of sixteen shifted values), and finally the duration of setting up the registers in the target device may be $T_{setup}$. Generally, these different durations have the following relationship:

$$T_{setup} < T_{fmux} < T_{add} < T_{shiftmux}$$

Thus, the total duration of the single MD5 step of FIG. 7A is:

$$T_{step} = T_{fmux} + 4*T_{add} + T_{shiftmux} + T_{setup}$$

(The appropriate duration values are shown between adjacent time marker pairs, $t_k - t_{k+1}$, in FIG. 7A.) After the step iterations are completed, the results must be added to the previous stage's values, requiring:

$$T_{add} + T_{setup}$$

In practice, the clock frequency used for calculations typically is limited by the longest duration of logic required between clocks. In the one-step logic of FIG. 7A, the MD5 step iteration logic takes much longer than the final addition step, so the iterative logic constrains the clock. Therefore, the total standard MD5 chunk calculation, consisting of 64 step iterations plus the final addition, requires:

$$T_{total(step)} = 65 * T_{step}$$

$$T_{total(step)} = 65 * (T_{fmux} + 4*T_{add} + T_{shiftmux} + T_{setup})$$

$$T_{total(step)} = 65*T_{fmux} + 260*T_{add} + 65*T_{shiftmux} + 65*T_{setup}$$

Figure 7C:
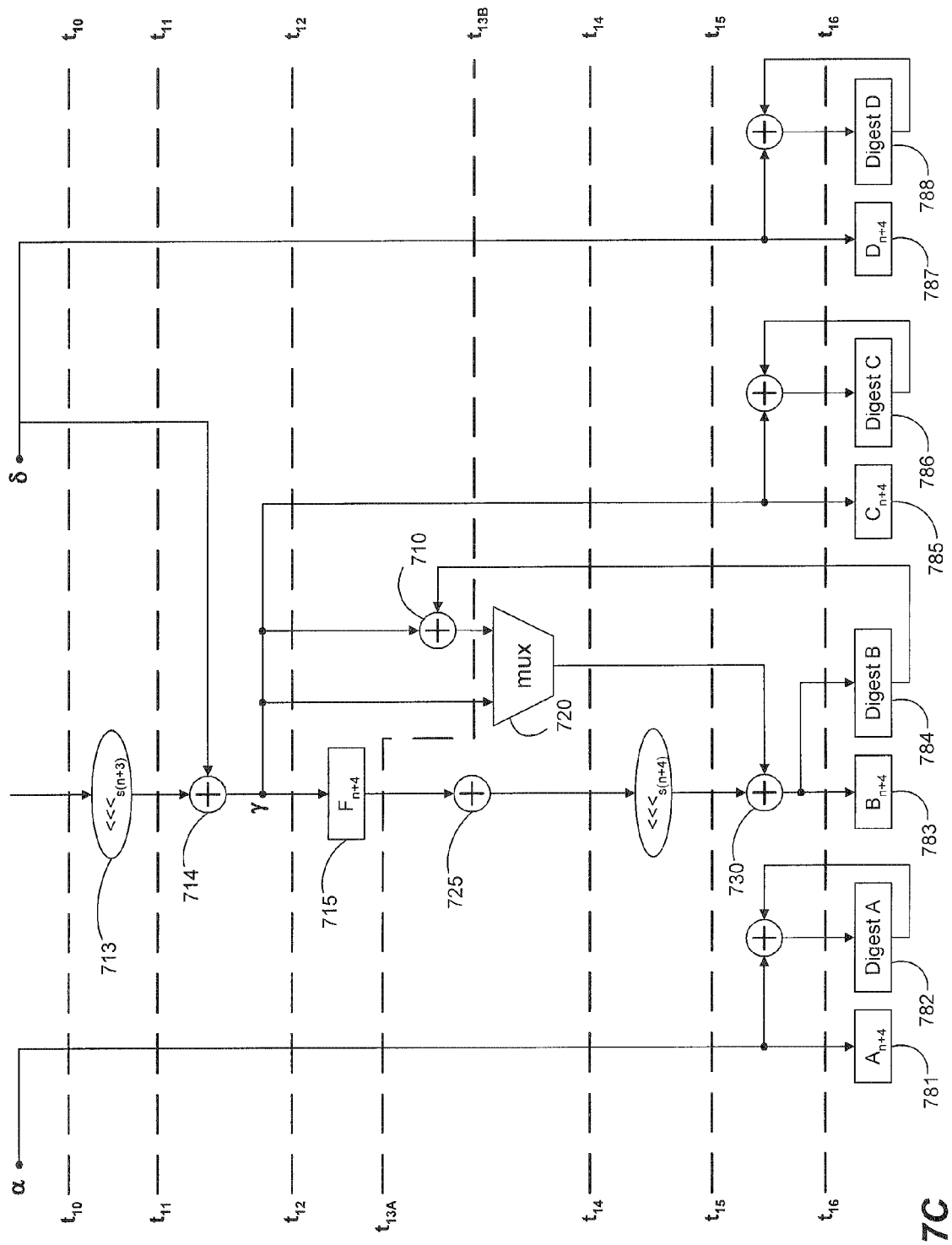
FIG. 7C is a partial timing diagram of a single-stage-iteration MD5 process for the fourth round of an MD5 process.
Figure 7D:
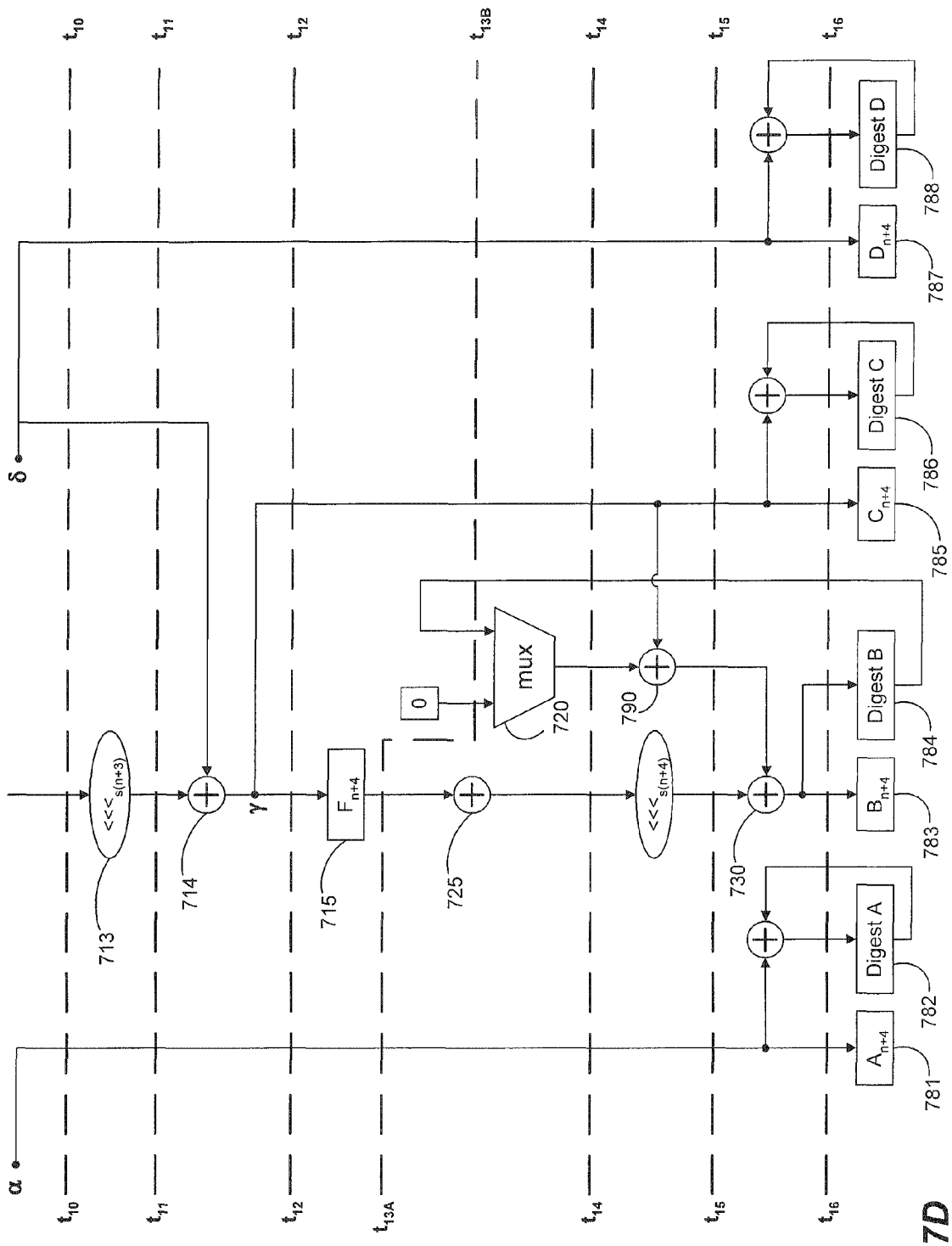
FIG. 7D is a partial timing diagram of a single-stage-iteration MD5 process for the fourth round of an MD5 process.

Using embodiments of the present invention, such as those shown in FIGS. 7B, 7C and 7D, the timing scheme of these hardware implementations can also be determined to help illustrate one or more advantages of embodiments of the present invention. These embodiments share the $T_{add}$ and $T_{setup}$ duration values with the steps of FIG. 7A. However, the embodiments of FIGS. 7B and 7C have two unique values—$T_f$ is the duration required to calculate one of the nonlinear functions F, G, H or I, without the need to select amongst these functions; and $T_{shift}$ is the required duration of a single, predetermined shift amount implemented in routing, as explained in connection with FIG. 7E. The relative durations of these four values are:

$$T_{setup} < T_{shift} < T_f < T_{add}$$

where $T_{shift} << T_{shiftmux}$; and $T_f << T_{fmux}$. (The appropriate duration values are shown between adjacent time marker pairs, $t_k - t_{k+1}$, in FIG. 7B.) Time $t_0 - t_1$ has two types of functions being performed, addition and a nonlinear function, though this step is dominated by the duration of adding $A_n$ to $MK_n$, so the duration is $T_{add}$. Like the standard MD5 implementation of FIG. 7A, the final round incorporates a final addition operation. As seen in more detail in FIG. 7C, the additions of Digest A, Digest C and Digest D values are performed in parallel with the final addition in the $t_{15}$ to $t_{16}$ time step, since all values needed for those additions are known by $t_{15}$.

In the final MD5 round, the Digest B addition typically would require the value obtained at $t_{16}$, which would force an additional $T_{add}$ duration in the time-critical path, further constraining the clock frequency. However, this additional duration is avoided by adding the Digest B value to an interim result at adder 710 in FIG. 7C (in the $t_{12}$ to $t_{13B}$ time step, generally parallel to the nonlinear function 715 during the $t_{12}$ to $t_{13A}$ time step), then multiplexing 720 the added value (in the $t_{13B}$ to $t_{14}$ time step, generally parallel to the adder 725 during the $t_{13A}$ to $t_{14}$ time step) into one of the inputs of the $t_{15}$ to $t_{16}$ time-critical path adder 730. The value from this multiplexing path is added into the time-critical path after all shifts are completed, allowing this value to be added into this path while maintaining mathematical equivalence. As reflected in the timing portion of FIG. 7C, the time duration required to perform the nonlinear function 715 and adding 725 is equal to (or nearly equal to) the time duration required to perform the adding 710 and multiplexing 720, even though the intermediate time points $t_{13A}$ and $t_{13B}$ are not necessarily contemporary. In these embodiments $T_{mux}$ is about equal to $T_f$, so that the time duration between $t_{12}$ and $t_{14}$ in either path is still $\sim T_f + T_{add}$ for both branches in the final stage, which performs 4 iterations to perform the final MD5 round.

In the first three MD5 rounds (for example, in three of the four processing engines implemented in a hardware device to perform MD5 hashing), the final operation branch including multiplexer 720 and adder 710 are not included since they serve no useful purpose until the final MD5 round. The output of the adder 714 is instead routed directly to adder 730. Thus adder 710 and multiplexer 720 can be omitted from the first three MD5 rounds, only being implemented in the fourth round stage according to the present invention. Also, equivalent final operation branching can be implemented in lieu of that shown as the multiplexing branch of FIG. 7C. For example, the final operation branch of FIG. 7D uses a multiplexer 720 having an output that is added to the value of $C_{n+4}$ before being an input to adder 730. Multiplexer 720 has a first input of "0" and a second input that is the B digest value 784. The "0" is used until the final sub-stage of the final stage (that is, the final or $64^{th}$ MD5 operation), when the B digest value 784 is selected to achieve the final digest values of the complete MD5 process. The resulting duration for the process of FIG. 7B (that is, the constraining value on the clock) is:

$$T_{total(stage)} = 3*T_f + 9*T\text{add} + 4*T\text{shift} + T\text{setup}$$

The MD5 chunk calculation for the claim design will require only 16 of these clocks, making the total duration equal to:

$$T_{total(stage)} = 16*T_{stage}$$

$$T_{total(stage)} = 16*(3*T_f + 9*T_{add} + 4*T_{shift} + T_{setup})$$

$$T_{total(stage)} = 48*T_f + 144*T_{add} + 64*T_{shift} + 16*T_{setup}$$

With fewer step durations in the time-critical path, and significantly faster steps substituted for some time-critical path components, embodiments of the present invention realize significant improvement over earlier MD5 process hardware implementations.

Sub-stages within each stage (for example, in FIG. 4, from initial register values 410 to point α, from point α to point δ, from point δ to γ, and finally from point γ to final register values 480) bear some resemblance to the standard MD5 portrayal of FIG. 3A, but bear important differences. First, the modulo additions of the M values (steps 441, 442, 443, 444 of FIG. 4) and the K values (steps 451, 452, 453, 454 of FIG. 4) are performed on the A register values prior to being modulo added with the output of the sub-stage's given nonlinear function. Moreover, as noted above and as seen in FIG. 7B, the M and K values can be pre-added once the message is received (denoted $MK_k$ in FIG. 7B).

The MD5 stage configuration of FIG. 4 provides significant time savings because of the static nature of the nonlinear function in each MD5 round and due to the quasi-cyclic nature of the shift function in each MD5 round as well. The nonlinear function F, G, H or I in each MD5 round does not change. According to an embodiment of the present invention, the calculation of successive operations for the MD5 digesting process may be pipelined to reduce the number of total cycles and reduce the complexity, logic and/or "lookups" needed to produce a 128 bit digest for a 512 bit block.

The nonlinear function F in each instance of stage 400 of FIG. 4 is fixed in the hardware implementation of FIG. 4. A "fixed nonlinear function" is defined for purposes of the disclosure, specification and claims as a hardware-implemented nonlinear function that is implemented without using a multiplexer or any other selective logic to choose the nonlinear function to be used. Therefore, as stage 400 of FIG. 4 moves through four cycles to complete a first MD5 round, the nonlinear function steps 421, 422, 423, 424 do not change and no lookup table retrieval or determination of the nonlinear function is required. The four nonlinear functions are defined and used to compute the message digest:

| | |
|---|---|
| F (B, C, D) = (B AND C) OR ((NOT B) AND (D)) | (round 1) |
| G (B, C, D) = (B AND D) OR (C AND (NOT D)) | (round 2) |
| H (B, C, D) = B XOR C XOR D | (round 3) |
| I (B, C, D) = C XOR (B OR (NOT D)) | (round 4) |

These four functions, F, G, H, and I, act in a "bitwise parallel" manner, to produce their outputs from the bits of the inputs B, C, and D.

Moreover, bit-shifts at steps 461, 462, 463, 464 also can be implemented on the hardware device without requiring shift value selection (due to the cyclic nature of shift values used within each round, as seen from the S values in FIG. 3B). FIG. 7E shows a direct routing bit-shift embodiment where a 4-bit shift (called for in the $33^{rd}$, $37^{th}$, $41^{st}$ and $45^{th}$ MD5 operations) in a 32-bit value is performed using direct routing in an FPGA or the like (for example, at step 463 of FIG. 4 and/or 713 of FIG. 7C). Bit $b_0$ goes to bit $b_4$, $b_1$ to $b_5$, etc., with the final 4 bits in the 32-bit value likewise moving to the first 4 bit positions—thus no LUTs or LUT delays are required for a shift.

Figure 8:
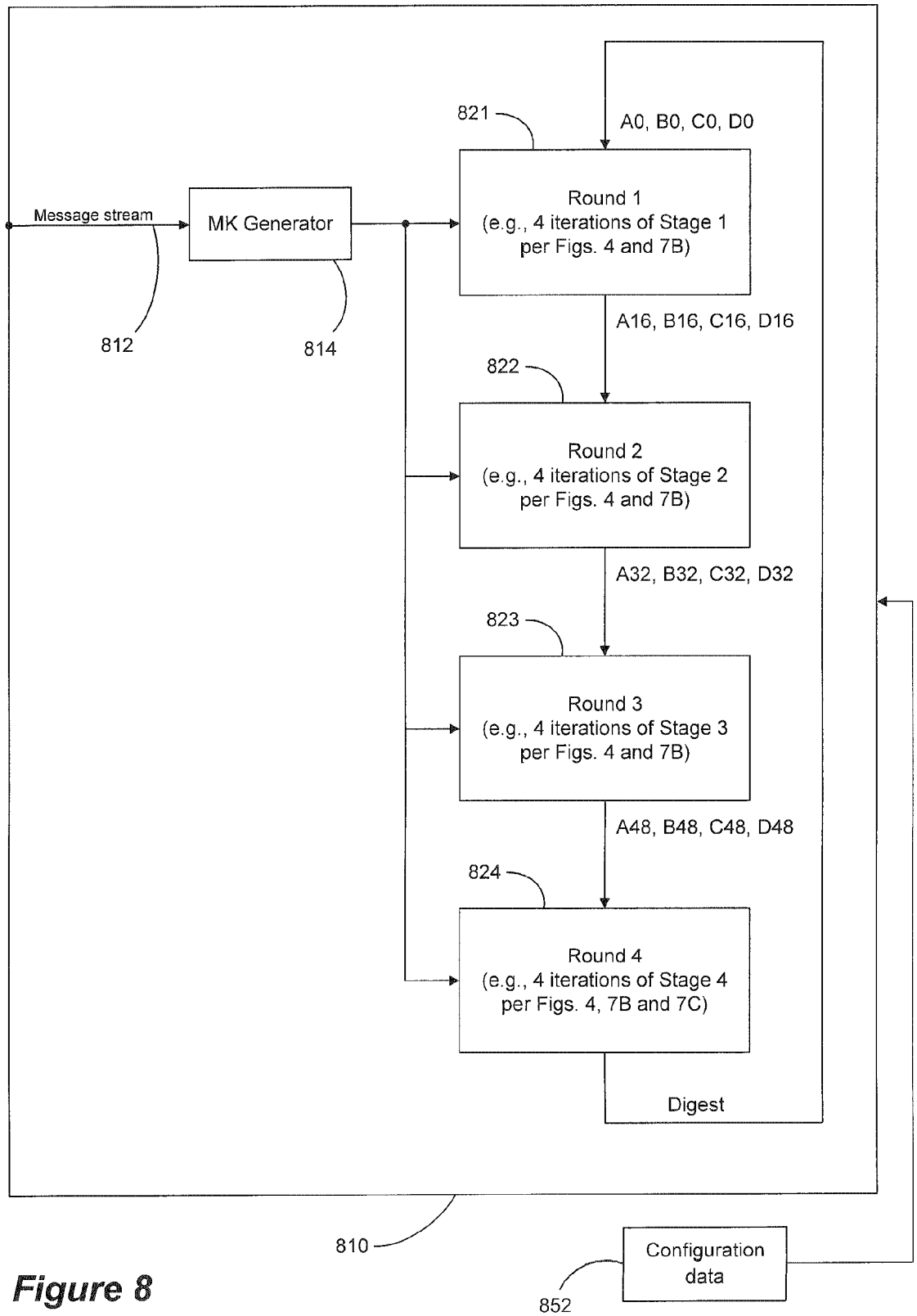
FIG. 8 is a hardware implementation of MD5 hashing using four processing engines implemented in a hardware device to perform MD5 hashing according to one or more embodiments of the present invention.

FIG. 8 shows a hardware device such as an FPGA 810 implementing 4 processing engines. Device 810 accepts a message stream from input 812, for example while performing replication functions. The message is provided to generator 814, which calculates M values for the given message, and pre-adds the M and K values once M has been supplied. Generator 814 supplies needed data to each MD5 stage processing engine 821, 822, 823, 824 (for example, as illustrated in FIGS. 4, 7B and/or 7C). MD5 Round 1 is performed in hardware implementation 821, Round 2 in hardware implementation 822, Round 3 in hardware implementation 823, and Round 4 in hardware implementation 824. Implementation 824 further includes the needed final adding to achieve a final digest value, per the MD5 process. Configuration data can be supplied to FPGA 810 from an appropriate source such as a memory 852 in a computer or other device.

Many features and advantages of the invention are apparent from the written description, and thus, the appended claims are intended to cover all such features and advantages. Further, numerous modifications and changes will readily occur to those skilled in the art, so the present invention is not limited to the exact operation and construction illustrated and described. Therefore, described embodiments are illustrative and not restrictive, and the invention should not be limited to the details given herein but should be defined by the following claims and their full scope of equivalents, whether foreseeable or unforeseeable now or in the future.

What is claimed is:

1. An MD5 processing apparatus comprising a programmable device programmed to include:
  a plurality of processing engines, wherein each processing engine is configured to perform one stage of an MD5 process, wherein each MD5 process stage comprises four MD5 operations in a corresponding MD5 round, each processing engine comprising:
    a 32-bit A register;
    a 32-bit B register;
    a 32-bit C register;
    a 32-bit D register and
    first, second, third and fourth sub-stage units, each sub-stage unit being configured to perform a corresponding one of the four MD5 operations in the corresponding MD5 round and each sub-stage unit comprising:
      a first adder comprising a plurality of logic cells configured to modulo add an A register value and an MD5 pre-adder value, wherein the MD5 pre-adder value comprises the modulo sum of an MD5 message segment and an MD5 constant value;
      a fixed MD5 nonlinear function processing unit comprising a plurality of logic cells configured to perform a fixed nonlinear function on inputs comprising a B register value, a C register value and a D register value;
a second adder comprising a plurality of logic cells configured to modulo add an output of the fixed MD5 nonlinear function processing unit and the first adder;
a fixed 32-bit-shift unit comprising routing circuitry configured to effect a fixed bit shift on an output of the second adder; and
a third adder comprising a plurality of logic cells configured to modulo add the B register value and an output of the fixed 32-bit-shift unit; and
a generator coupled to each of the processing engines, the generator being configured to pre-calculate a plurality of MD5 pre-adder values including the MD5 pre-adder value concurrently with the performing of the stages of the MD5 process by the processing engines;
wherein each stage of the MD5 process performs the four MD5 operations of the corresponding MD5 round via the corresponding sub-stage units for advancing register values in the A register, B register, C register and D register respectively from $A_n$, $B_n$, $C_n$, $D_n$ to $A_{n+4}$, $B_{n+4}$, $C_{n+4}$, $D_{n+4}$, respectively, and
wherein each of the processing engines is configured to perform four iterations of the corresponding stage of the MD5 process to complete the corresponding MD5 round before supplying a corresponding output value,
wherein a first processing engine of the processing engines is configured to supply the corresponding output value to a second processing engine of the processing engines; and
wherein the second processing engine is configured to output an MD5 digest value as the corresponding output value.

2. The MD5 processing apparatus of claim 1 wherein the programmable device is an FPGA.

3. The MD5 processing apparatus of claim 1 wherein one of the stages further comprises a multiplexing branch comprising:
a multiplexer comprising a plurality of logic cells having first and second multiplexer inputs and a multiplexer output;
a pre-multiplexing adder comprising a plurality of logic cells configured to modulo add a final stage C register value and a digest B register value to generate the second multiplexer input;
wherein the first multiplexer input is the final stage C register value;
further wherein the second multiplexer input is selected as the multiplexer output when the processing engine is performing a final MD5 operation of the MD5 process; and
further wherein the first multiplexer input is selected as the multiplexer output when the processing engine is not performing the final MD5 operation.

4. The MD5 processing apparatus of claim 1 wherein the fixed nonlinear function comprises a hardware-implemented nonlinear function implemented without using a multiplexer or any other selective logic.

5. The MD5 processing apparatus of claim 1 wherein the fixed bit shift comprises a hardware-implemented bit shift performed using direct routing of bit values.

6. An MD5 hashing hardware implementation comprising a field programmable gate array (FPGA) programmed to include:
four processing engines, wherein each processing engine is configured to perform one stage of an MD5 process, wherein each MD5 process stage comprises four MD5 operations in a corresponding MD5 round, each processing engine comprising:
four 32-bit registers designated A, B, C and D, wherein each register holds a value; and
four serially connected sub-stage units, each sub-stage unit being configured to perform a corresponding one of the four MD5 operations in the corresponding MD5 round and each sub-stage unit comprising:
a first adder configured to modulo add the A register value and an MD5 pre-adder value, wherein the MD5 pre-adder value comprises the modulo sum of an MD5 message segment and an MD5 constant value;
a fixed MD5 nonlinear function processing unit configured to perform a fixed nonlinear function on the B, C and D register values, wherein the fixed MD5 nonlinear function processing unit implements only a single hardware-implemented MD5 nonlinear function;
a second adder configured to modulo add an output of the fixed MD5 nonlinear function processing unit and the first adder;
a fixed 32-bit-shift unit configured to effect a fixed bit shift on an output of the second adder, wherein the fixed 32-bit-shift unit implements only a single hardware-implemented MD5 shift value;
a third adder configured to modulo add the B register value and an output of the fixed 32-bit-shift unit; and
a generator coupled to each of the four processing engines, the generator being configured to pre-calculate a plurality of MD5 pre-adder values, including the MD5 pre-adder value, concurrently with the performing of the stages of the MD5 process by the four processing engines,
wherein each stage advances A, B, C and D register values from $A_n$, $B_n$, $C_n$, $D_n$ to $A_{n+4}$, $B_{n+4}$, $C_{n+4}$, $D_{n+4}$;
wherein each processing engine is configured to perform four iterations of the corresponding stage of the MD5 process to perform the corresponding MD5 round before supplying a corresponding output value; and
wherein a first processing engine of the processing engines is configured to supply the corresponding output value to a second processing engine of the processing engines; and
wherein the second processing engine is configured to output an MD5 digest value as the corresponding output value.

7. The MD5 hashing hardware implementation of claim 6 wherein one sub-stage unit of one of the processing engines further comprises a multiplexing branch comprising:
a multiplexer comprising a plurality of logic cells having first and second multiplexer inputs and a multiplexer output;
a pre-multiplexing adder comprising a plurality of logic cells configured to modulo add a final stage C register value and a digest B register value to generate the second multiplexer input;
wherein the first multiplexer input is the final stage C register value;

further wherein the second multiplexer input is selected as the multiplexer output when the processing engine is performing a final MD5 operation of the MD5 process; and further wherein the first multiplexer input is selected as the final stage C register value when the processing engine is not performing the final MD5 operation.

8. The MD5 hashing hardware implementation of claim 6 wherein the single hardware-implemented MD5 shift value is implemented by performing direct routing of bit values.

9. An MD5 hashing hardware implementation comprising an FPGA programmed comprising:
- a processing engine configured to perform one stage of an MD5 process, the processing engine comprising:
  - four 32-bit registers designated A, B, C and D, wherein each register holds a value; and
  - a time-critical path comprising four serially connected sub-stage units, each sub-stage unit being configured to perform a corresponding one of four MD5 operations in the one stage of the MD5 process and each sub-stage unit comprising:
    - a first adder configured to modulo add the A register value and an MD5 pre-adder value, wherein the MD5 pre-adder value comprises the modulo sum of an MD5 message segment and an MD5 constant value;
    - a fixed MD5 nonlinear function processing unit configured to perform a fixed nonlinear function on the B, C and D register values, wherein the fixed MD5 nonlinear function processing unit implements only a single hardware-implemented MD5 nonlinear function;
    - a second adder configured to modulo add an output of the fixed MD5 nonlinear function processing unit and the first adder;
    - a fixed 32-bit-shift unit configured to effect a fixed bit shift on an output of the second adder, wherein the fixed 32-bit-shift unit implements only a single hardware-implemented MD5 shift value;
    - a third adder configured to modulo add the B register value and an output of the fixed 32-bit-shift unit, wherein the output of the fixed 32-bit-shift unit is provided to the third adder via direct bit routing to the third adder; and
- a generator coupled to the processing engine and another processing engine, the generator being configured to pre-calculate a plurality of MD5 pre-adder values, including the MD5 pre-adder value, concurrently with the performing of the stage of the MD5 process by the processing engine,
- wherein the A, B, C and D register values at the beginning of the time-critical path are $A_n$, $B_n$, $C_n$, $D_n$, and further wherein the A, B, C and D register values at the end of the time-critical path are $A_{n+4}$, $B_{n+4}$, $C_{n+4}$, $D_{n+4}$;
- further wherein the processing engine is configured to perform four iterations of the stage to complete one MD5 round of the MD5 process before supplying an output value to the another processing engine;
- wherein the MD5 process comprises four MD5 rounds; and
- wherein the another processing engine being configured to perform another stage of the MD5 process and to output an MD5 digest value.

10. The MD5 processing apparatus of claim 9 wherein one of the stages further comprises a final operation branch that adds a digest B register value to the output of the third adder of the third sub-stage unit during a final MD5 process stage of the MD5 process to generate a final operation adjustment value that the third adder of the fourth sub-stage unit modulo adds to the output of the fourth sub-stage unit fixed 32-bit-shift unit instead of the B register value.

* * * * *